(12) United States Patent
Shtivelman (10) Patent No.: US 6,922,689 B2
(45) Date of Patent: Jul. 26, 2005

(54) METHOD AND APPARATUS FOR AUTO-ASSISTING AGENTS IN AGENT-HOSTED COMMUNICATIONS SESSIONS

(75) Inventor: Yuri Shtivelman, San Francisco, CA (US)

(73) Assignee: Genesys Telecommunications, Daly City, CA (US)

( * ) Notice: Subject to any disclaimer, the term of this patent is extended or adjusted under 35 U.S.C. 154(b) by 52 days.

(21) Appl. No.: 09/457,608

(22) Filed: Dec. 8, 1999

(65) Prior Publication Data

US 2002/0059164 A1 May 16, 2002

Related U.S. Application Data

(63) Continuation-in-part of application No. 09/452,541, filed on Dec. 1, 1999, now Pat. No. 6,535,492.

(51) Int. Cl.[7] .............................................. G06F 17/30
(52) U.S. Cl. ............................ 707/3; 707/5; 707/200; 709/203; 345/758; 706/45
(58) Field of Search ........................ 707/1–8, 9, 10, 707/100–104, 500–501, 513–515, 530–536, 200; 706/16, 45–50, 61, 934; 704/7–10, 221, 251, 257, 259; 709/200–201, 203, 217–219, 227; 710/67; 345/329, 333, 335, 336, 968, 758, 753, 733, 751; 382/155–159; 375/220–222; 705/26–27

(56) References Cited

U.S. PATENT DOCUMENTS

| | | | | |
|---|---|---|---|---|
| 5,355,474 A | * | 10/1994 | Thuraisngham et al. | 707/9 |
| 5,444,823 A | * | 8/1995 | Nguyen | 706/54 |
| 5,802,493 A | * | 9/1998 | Sheflott et al. | 345/803 |
| 5,828,839 A | * | 10/1998 | Moncreiff | 709/204 |
| 5,852,814 A | * | 12/1998 | Allen | 706/13 |
| 5,958,016 A | * | 9/1999 | Chang et al. | 709/202 |
| 5,978,467 A | * | 11/1999 | Walker et al. | 379/266 |
| 5,987,446 A | * | 11/1999 | Corey et al. | 707/3 |
| 6,021,411 A | * | 2/2000 | Brophy et al. | 707/103 |
| 6,085,201 A | * | 7/2000 | Tso | 707/505 |
| 6,098,065 A | * | 8/2000 | Skillen et al. | 707/3 |
| 6,167,395 A | * | 12/2000 | Beck et al. | 707/3 |
| 6,175,842 B1 | * | 1/2001 | Kirk et al. | 345/419 |
| 6,181,736 B1 | * | 1/2001 | McLaughlin et al. | 375/222 |
| 6,219,045 B1 | * | 4/2001 | Leahy et al. | 345/757 |
| 6,345,290 B2 | * | 2/2002 | Okada et al. | 709/203 |
| 6,346,952 B1 | * | 2/2002 | Shtivelman | 345/753 |
| 6,366,925 B1 | * | 4/2002 | Meltzer et al. | 705/1 |
| 6,377,944 B1 | * | 4/2002 | Busey et al. | 370/389 |
| 6,434,549 B1 | * | 8/2002 | Linetsky et al. | 707/3 |
| 6,535,492 B2 | * | 3/2003 | Shtivelman | 370/270 |
| 6,785,740 B1 | * | 8/2004 | Yoneda et al. | 709/246 |
| 2001/0042095 A1 | * | 11/2001 | Kim et al. | 709/204 |
| 2001/0054064 A1 | * | 12/2001 | Kannan | 709/203 |

FOREIGN PATENT DOCUMENTS

WO WO96/23265 * 8/1996 ............... 17/30

OTHER PUBLICATIONS

Yong Wang et al., "Real–time scheduling for multi–agent call center automation", Information service agents lab, school of computing science Simon fraser University, Burnaby,BC Canada, 13 pages.*

Howard Bernett et al., Assessing web–enabled call center technologies, IT Pro May–Jun. 2001, pp.:24–30.*

* cited by examiner

Primary Examiner—Srirama Channavajjala
(74) Attorney, Agent, or Firm—Donald R. Boys; Central Coast Patent Agency, Inc.

(57) ABSTRACT

A communication center has a system for managing agent-hosted sessions including systems for storing queries and responses to queries in sessions in associated pairs, and for comparing newly-arriving queries with stored query-response pairs. In the event of a match or near match, stored responses to oft-repeated queries are provided to agents for use, relieving agents of the tasks of responding manually to often-repeated queries. Parsing and sentence structure tools are used, and in some cases aid stations with knowledge workers are provided to allow editing and extra help for agents.

18 Claims, 6 Drawing Sheets

METHOD AND APPARATUS FOR AUTO-ASSISTING AGENTS IN AGENT-HOSTED COMMUNICATIONS SESSIONS

CROSS-REFERENCE TO RELATED DOCUMENTS

The present invention is a continuation in part (CIP) to a patent application entitled "Method and Apparatus for Assigning Agent-led Chat Sessions Hosted by a Communication Center to Available Agents Based on Message Load and Agent Skill-Set" U.S. Ser. No. 09/452,541 is now U.S. Pat. No. 6,535,492 filed on Dec. 1 1999, disclosure of which is incorporated in its entirety herein by reference.

FIELD OF THE INVENTION

The present invention is in the field of data network telephony (DNT) communication and pertains more particularly to methods and apparatus for auto-assisting agents participating in agent-led chat sessions.

BACKGROUND OF THE INVENTION

In the field of DNT communications, contact events incoming to and outgoing from a DNT capable communication-center are propagated over switched-packet data networks (SPDN) such as a wide-area-network WAN, which may include the Internet. Internet-protocol-network-telephony, a sub-set of DNT, wherein voice and data calls are handle by suitable computer equipment and software is a typical and oft used DNT implementation. Other examples include e-mail, file transfer, instant messaging electronic facsimile, and so on.

Such DNT capability as described above provides added flexibility to agents operating within a communication center and opens up new mediums of contact for clients wishing to interact with the center. For example, agents are no longer slaved to a traditional telephony system. A new breed of agent, termed a multimedia agent, works with several different media types, hence the term multimedia.

Such agents as described immediately above, will likely share a local-area-network (LAN) connection whereby individual agent personal-computer/video-display-units (PC/VDUs) may communicate with one another and with automated systems and switches within the communication center. In some cases, agents will operate DNT capable telephones. Communication centers employing data network capabilities may still practice standard computer integrated telephony (CTI) as known in the art. However, one with skill in the art will appreciate that DNT is forging huge in-roads into the field of telephony.

One IPNT medium that is part of the DNT family is the well-known chat session. A chat session is facilitated by software at each client station and at a communications server hosted somewhere in an Internet-Protocol (IP) data network (typically the Internet). A chat session is typically hosted by a facilitator or session leader, which controls the rules and regulations governing each session. Typically a session master has controls provided to him that enable him to mute other participants, eject certain individuals from a session, direct the topics, and so on.

More recently, chat-room communication has become an important tool for public interface at many DNT capable communication centers. A single agent may effectively host more than one and up to several on-going chat sessions simultaneously. In a situation such as this, certain parameters regarding the chat sessions themselves and the agents hosting them are typically observed. For example, it is desired that the topic or purpose of each chat session assigned to a particular agent agree at least somewhat with the hosting agent's skill-level. It is similarly desired that any agent hosting a chat session or sessions is not overloaded or under utilized while engaged in response to communication loads in a session or sessions.

In prior art communication centers, such parameters are manually configured for each scheduled or ongoing session. This can be problematic because levels of communication loads associated with chat sessions can vary somewhat rapidly for any given number of participants. Moreover, limits regarding a number of participants allowed in each active chat session must be manually set by agents or an administrator on be-half of agents. Because of constant fluctuations regarding communications loads and number of participants logging into any chat session, and the inconvenience associated with manual adjustment of such chat session parameters, agents are often overloaded or under utilized for significant periods of time.

A system known to the inventor and disclosed by the specification listed in the cross-reference section above allows agents to be automatically assigned, relieved, and reassigned to communication-center chat sessions and other hosted participatory sessions based on message load and skill set. The routing system described in the co-pending specification uses agent-session monitoring software and algorithms to calculate total message-load experienced by any agent participating in a chat session or sessions and, according to preset load thresholds and agent skills, balances total incoming loads such that any particular agents are not overloaded or under-utilized when engaged in such sessions. For convenience in the descriptions that follow, sessions will be referred to as chat sessions, although the inventor intends the invention to be applicable to all sorts of hosted communication sessions. Chat sessions are a convenient example for illustrating the features and functions of the invention.

Many queries initiated by customers in center-hosted chat sessions are repeated many times. For example, a query about how to activate a particular software application once it is installed will have the same answer provided the computer platform and version of the software application are constant. Many companies post frequently-asked-questions (FAQ) pages to alleviate agents from constantly answering repetitive questions having the same responses. However, FAQ pages may not contain all of the required information in their generic responses or the exact query as posed by a customer. Moreover, there may be many question/response interactions listed on a FAQ page requiring extensive scrolling by a customer to find, if available, the desired question and response. Customers may easily be intimidated by using an extensive FAQ page.

In chat applications known to the inventor and hosted through communication-center facilities, chat interaction is threaded and stored in a history database for later research. This may be accomplished regardless of whether the chat session is text-based or voice-based. For example, text-based threads originating in text chat are organized into a text database whereas voice interaction (voice chat) may be recorded and stored in a multimedia database with text copies of such interactions stored in a text database.

It has occurred to the inventor that in addition to enabling an agent engaged in chat communication to work with an acceptable message load, additional automated assistance may be provided to further reduce an agent's response requirements when answering many chat queries.

What is clearly needed is an automated method and apparatus for assisting agents participating in one or more chat sessions to quickly respond to oft-asked questions without requiring significant manual input by such an agent. Such an automated system would act to reduce agent load during sessions and convenience a customer by enabling the customer to get a direct answer through the session.

SUMMARY OF THE INVENTION

In a preferred embodiment of the present invention a method for aiding an agent in a hosted communication session is provided, comprising steps of (a) accessing an incoming query to an agent-hosted session by a comparison system; (b) comparing the incoming query with queries in a database having stored queries matched with stored responses; and (c) in the case of a match, providing the stored response to the agent for use in responding to the incoming query.

In some embodiments in step (a) the incoming query is parsed for content. The parsing may also comprise one or both of determining one or more keywords in the incoming query, and determining sentence structure.

Also in preferred embodiments the incoming query is intercepted by a hardware/software system which relates the query to one or more of the hosted session, the agent host, and the sender, and stores the query, associated with the agent's response, in a thread-managed database. The hardware/software system may also parse the query and search the database for matching or near-matching queries associated with stored responses, and finding matches or near matches, causes candidate responses to be posted to the agent.

In some cases multiple candidate responses are provided to the agent with or without the associated query, and the agent has a selection mechanism for quickly selecting and posting a selected response to the query. In other cases a response is posted to the query automatically by the system without selection or intervention by the agent.

In still other embodiments there is an interface for a knowledge worker, such that queries and associated responses are displayed for the knowledge worker, who may use provided tools for selecting, editing, and posting responses to individual ones of hosted sessions. Standard responses may be provided to the agent as keystroke response codes, wherein the agent may select and post a response by one or a combination of keystrokes.

In another aspect of the invention a system for aiding agent hosts in hosted communication sessions is provided, comprising a hardware software system for associating incoming queries with agent-composed responses and storing associated query-responses in a thread-managed database; and an agent station having a user interface for the agent to interact with the system. The system is characterized in that the hardware/software system accesses an incoming query, searches for matches and near-matches to previously stored queries associated with responses, and finding a match, provides the response or responses to the agent at the agent station to be used in responding to the incoming query.

In preferred embodiments the incoming query is parsed for content, and the parsing may include one or both of determining one or more keywords in the incoming query, and determining sentence structure. Further the incoming query may be related to one or more of the hosted sessions, the agent host, and the sender, and stored, associated with the agent's response, in a thread-managed database. Also in preferred embodiments the hardware/software system parses the query and searches the database for matching or near-matching queries associated with stored responses, and finding matches or near matches, causes candidate responses to be posted to the agent. Multiple candidate responses may provided to the agent with or without the associated query, and the agent station comprises in some cases a selection mechanism for quickly selecting and posting a selected response to the query by the agent. In some cases a response is posted to the query automatically by the system without selection or intervention by the agent at the agent station.

The system of the invention in some preferred embodiments comprises also a workstation with an interface for a knowledge worker, such that queries and associated responses are displayed for the knowledge worker, who may use provided tools for selecting, editing, and posting responses to individual ones of hosted sessions. In some embodiments are provided to the agent as keystroke response codes, wherein the agent may select and post a response by one or a combination of keystrokes.

In various embodiments of the invention described in enabling detail below, for the first time a system is provided for easing the workload of agents in agent-hosted communication and help sessions, such that often asked questions may be responded to by an agent without the agent having to manually compose a response in every case.

DESCRIPTION OF THE PREFERRED EMBODIMENTS

Figure 1:
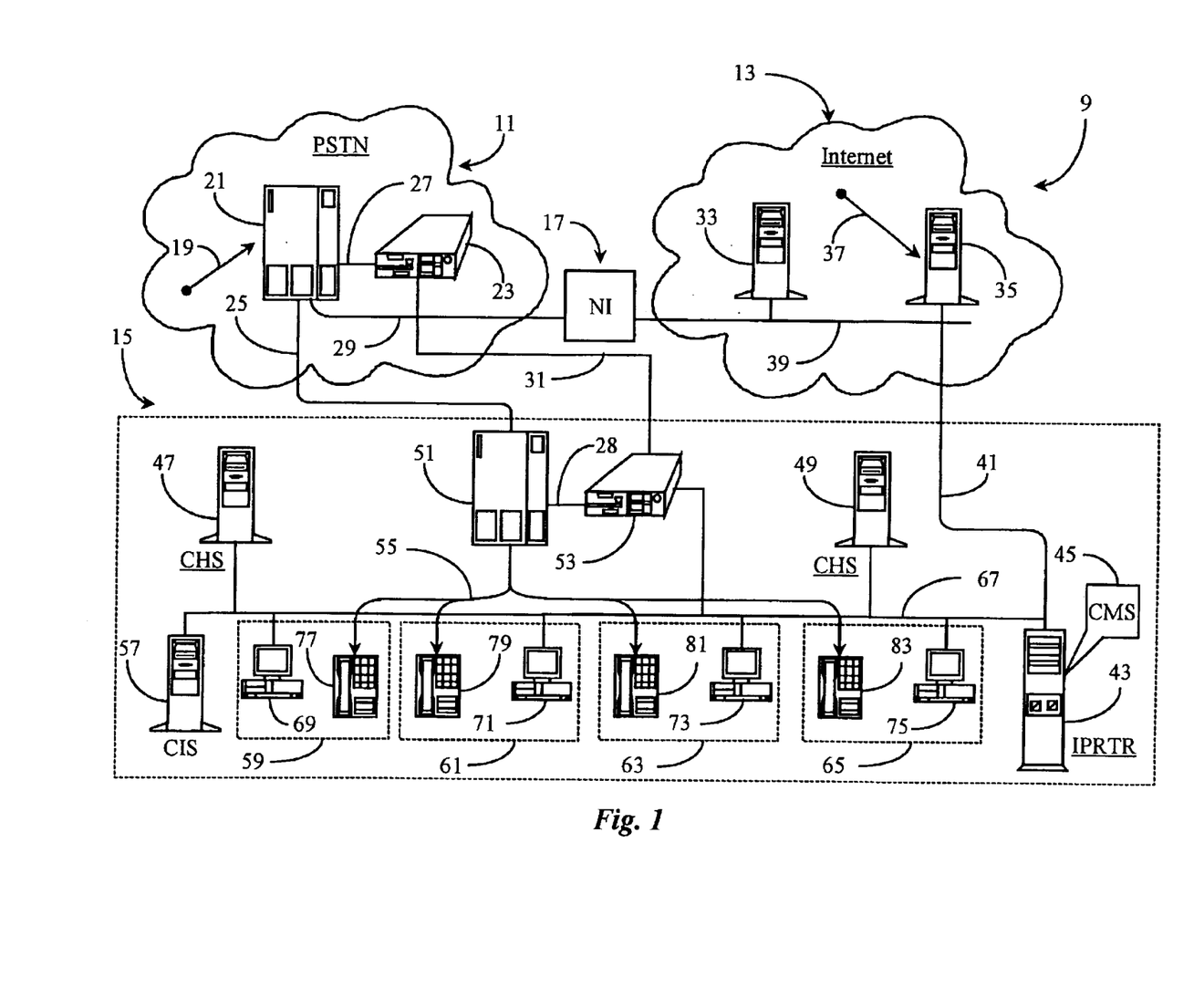
FIG. 1 is an overview of a communications network including a DNT-capable communication-center operating a chat-management software according to an embodiment of the present invention.

FIG. 1 is an overview of a communications network 9 including a DNT-capable communication-center 15 operating a chat-management software 45 according to an embodiment of the present invention. Communications network 9 comprises center 15, a public-switched-telephony-network (PSTN) 11, and the well-known Internet network represented herein by cloud 13. The inventors herein use well-known chat-sessions as a prime example of agent-led communication sessions that are amenable to practice of the present invention. The invention is not limited to chat management.

PSTN 11 may be a private telephony network instead of a public network. Internet 13 may be a private wide-area-network WAN, or a public WAN other than the Internet. The inventor chooses to illustrate PSTN 11 and Internet 13 because of the large public-access characteristic of both networks.

PSTN 11 may be assumed to contain all of the necessary equipment and connections required to process and route connection-orientated-switched-telephony (COST) events sourced from anywhere in cloud 11 to appropriate destinations. A network telephony switch 21 is provided in cloud 11 and is enhanced for computer-telephony-integration (CTI) by a CTI processor 23. Switch 21 may be a service-control-point (SCP), an automatic call distributor (ACD), or any other known type of call processing switch apparatus of system. Switch 21 is connected to CTI processor 23 by a CTI link 27.

CTI processor 23 is provided, in this example, to enable communication-center control by center 15 over call processing and switching functions performed by switch 21. Switch 21 in cloud 11 is connected to a central telephony switch 51 in communication center 15 by a telephony trunk 25. CTI processor 23 is connected to a like CTI processor 53 in communication center 15 by a data network connection 31. Processor 53 is connected to switch 51 by a CTI link 28. A vector 19 represents calls arriving at switch 21 for processing.

Internet 13 may be assumed as is known in the art to contain all of the necessary equipment and connections required to route communication events (organized into data-packets) to their appropriate destinations in Internet 13 or to such as communication center 15. Illustrated within Internet 13 are two file servers 33 and 35. File servers 33–35 are provided, hosted by center 15, and adapted to serve data to requesting clients and to act as interfacing machines to other machines and to communication center 15. In this example, server 33 may be a main company server with links to contact (live communication) pages hosted in server 35. Servers 33–35 are connected to an Internet backbone 39, which represents the numerous lines and connections comprising the Internet as known in the art. There may be one, or more than one server such as servers 33–35 maintained in Internet 13 by or on behalf of a company hosting center 15. The inventor deems that illustrating two such servers, either one of or both of which may be adapted to communicate with center 15, is sufficient for the purpose of explaining the present invention.

Server 35 is, in this example, additionally enhanced for functioning as a data router for callers 37 attempting to connect by data-network telephony (DNT) to communication center 15. Server 35 is connected to an Internet protocol router (IPRTR) 43 provided within communication center 15 by an Internet connection path 41. IPRTR 43 represents the first routing point within center 15 for DNT events 37. Path 41 may be a telephony connection line, an integrated services digital network line, or any other Internet connection facility.

A network bridge interface (NI) 17 is provided and adapted to enable PSTN calls to enter cloud 13 to be routed as DNT calls. Similarly, NI 17 may be used for converting DNT calls to PSTN calls for routing through PSTN 11 as COST events. NI 17 uses conversion protocols that are known in the art.

Communication center 15 is adapted, in this example, for receiving both COST communication events and DNT communication events. Thus center 15 is a dually-capable communication center. In some less sophisticated embodiments, center 15 may be adapted solely for DNT communication. COST communication in center 15 in this embodiment is internally routed by CTI-enhanced switch 51, while DNT communication is internally routed by IPRTR 43. Switch 51 and IPRTR 43 represent first routing points within center 15 for communication events incoming from PSTN 11 and Internet 13 respectively.

A plurality of agent workstations, 59, 61, 63, and 65 are provided and adapted to facilitate communication and other tasks performed by agents working in center 15. In this example, each station 59–65 is provided with an agent telephone for facilitating COST communication. These are, as illustrated, telephones 77, 79, 81, and 83 respectively. Telephones 77–83 are connected to CTI-enhanced switch 51 by internal COST wiring 55.

Each agent workstation 59–65 is also provided with a PC/VDU for facilitating DNT communication and for performing other communication-center tasks. These are, as illustrated, PC/VDU 69, 71, 73, and 75 respectively. Each PC/VDU such as PC/VDU 69 in station 59 is connected to a LAN 67. LAN 67 is connected to IPRTR 43 and is used to carry routed DNT communication events to each of PC/VDUs 69–75. LAN 67, in this example, is adapted to operate according to transfer control protocol/Internet protocol (TCP/IP). Thus, LAN 67 is adapted to facilitate IPNT, which is described as a sub-set of DNT in the background section. IPNT communication types include such as E-mail, IP phone, instant messaging, E-commerce, IP chat, Internet file transfer, and so on. In some cases the PC/VDU and COST telephone capabilities at an agent station may be integrated in any one of several ways, allowing agents to interface with both COST and DNT events.

A customer information server (CIS) 57 is provided in this embodiment, connected to LAN 67, and accessible to agents operating at stations 59–65. CIS 57 stores information about customers of communication center 15. Such information may include account information, payment histories, personal data (address, telephone, etc.), profile information, and so on. Agents may access CIS 57 when communicating with a customer to obtain information about that customer, or enter information provided by a customer during an interaction. In some cases data from CIS server 57 is provided to agents automatically in handling communication events.

CTI processor 53 is also connected to LAN 67 as shown. In this way, information about a caller placing call 19, waiting to be routed at switch 21 in PSTN 11, may be forwarded to an agent operating at one of stations 59–65 perhaps ahead of the actual COST call. Moreover, intelligent routing routines facilitated by software (not shown), termed T-server software by the inventor and executing on server 23, may be administered from within communication center 15. T-server software is implemented at processors 23 and 53. The implementation of processors 23, 53, and separate data-network 31 enables "agent level routing" to be performed at network level. Other functions such as interactive voice response (IVR), statistical functions (STAT), call load balancing, and the like are not shown but may be assumed to be available to processor 23 at switch 21.

The detailed description of the integral elements of communication network 9 and various communication paths described above is exemplary only and serves to familiarize with the various and exemplary communication and routing capabilities of communication center 15 as a state-of-the-art facility in a background sense. However, for the purpose of the present invention, the only medium of communication that will be explicitly addressed herein after is IPNT chat communication. It is to chat communication that the present invention pertains particularly.

Two exemplary chat servers (CHS) 47 and 49 are provided and connected to LAN 67. CHS 47 and CHS 49 are utilized for facilitating multi-person chat sessions hosted by agents operating such as stations 59–63. At any given time, there may be dozens of ongoing chat sessions facilitated by servers 47 and 49. In this example, each chat sessions held in server 47 or 49 is dedicated to a specific topic pertaining to some aspect of communication-center business. If center 15 is a computer distributor, for example, then chat sessions may be about technical issues related to customer implementation and use of the computers and/or software purchased. Therefore, it will be appreciated that many different topics may be used for many separate chat sessions. It will also be appreciated that there may be more or fewer CHS's such as servers 47 and 49 represented herein. The inventor deems that illustration of two such servers is sufficient for the purpose of explaining the present invention.

IPRTR 43 maintains a continuous Internet connection to server 35 by way of path 41. Therefore, LAN-connected CHSs 47 and 49 may be considered on-line servers even though they are not directly connected to backbone 39 in Internet cloud 13. In an alternative embodiment, servers 47 and 49 may be in Internet cloud 13 instead of at the premises of center 15. The fact that they are on LAN 67 in this example represents a convenience only and is not required.

Scheduled chat sessions hosted by servers 47 and 49 are advertised in server 35 and may be accessed by anyone with the appropriate computer equipment, chat software and Internet connection. Such conventions are known in the art as well as are the methods of joining and participating in a running chat session. Therefore detailed descriptions of known chat features and capabilities will not be provided here, but are noted to be available to the inventor and the skilled artisan. It is sufficient to say that all existing features found in current chat programs are supported by the present invention including voice chat.

An instance of chat-management software (CMS) 45 is provided to execute on IPRTR 43 in this embodiment. CMS 45 is a novel and unique implementation adapted to monitor parameters associated with ongoing chat sessions hosted in servers 47 and 49. CMS 45 is further adapted to assign and re-assign agents to host ongoing chat sessions based on known agent load capacities and agent skill levels. CMS 45 may also adjust wait time in chat sessions as a way to adjust agent load. Wait time is a function of an agent's skill level in responding to communications in such sessions, and reflects the time it takes, on average, for an agent to respond to a communication. Adjusting this parameter has an effect of changing the determination of whether an agent is overloaded. In this sense, CMS 45 comprises a monitoring and reporting component and an agent routing component. CMS 45 eliminates the prior-art requirements of manually configuring hosts for chat sessions.

It is not required that CMS 45 be resident on IPRTR 43 in order to practice the present invention. For example, CMS 45 may instead be provided as monitoring and reporting instances resident in each of chat servers 47 and 49 with a main processing component provided in IPRTR 45. Providing at least a main component in IPRTR 45 allows integration with other routing routines or data that may be used in making routing decisions.

In practice of the present invention a plurality of scheduled chat sessions, hosted by servers 47 and 49 are ongoing at any given time within communication center 15. Such sessions are advertised to the public in such as server 35 in Internet 13. IPRTR 43 by way of CMS 45 assigns specific agents to host the sessions according to topic, skill level, and other communication-center rules. One agent may be assigned to more than one chat session depending on chat topic and versatility of agent skill. Interested persons navigating server 35 such as represented by vector 37 may access and join any one of the ongoing chat sessions by conventional means (clicking a chat-link, etc.).

Each ongoing chat session may have a limit set on a number of participants allowed to join one session before the session is considered full as is generally known in the art. Each session is monitored by CMS 45 with respect to a current "message load" defined in one embodiment as the frequency of incoming messages and agent responses averaged over a given time period. If an agent is hosting more than one chat session then the total message load values for each session are combined and averaged over a given time interval for all of the sessions hosted by that agent. The total results are compared to pre-set maximum and minimum limit values applied to a particular agent hosting the sessions.

If total traffic for an agent meets or exceed that agent's maximum limit value over a given time period the agent in question is considered to be at capacity or overloaded (working beyond his or her capacity). If the total traffic for an agent is at or below the agent's minimum limit value over a given time period, then the agent in question is determined to be under-utilized. CMS 45, based on results compiled for each hosting agent, assigns new or under-utilized agents to sessions taken away from overworked agents, and/or retires under-utilized agents from chat sessions, and/or adjusts wait time in sessions. CMS 45 may also re-assign retired agents to other duties. CMS 45 may also add new agents to chat-hosting duties if total maximum loads of all current hosting agents are approaching or close to maximum individual limits. More detail about CMS 45 according to embodiments of the present invention is provided below.

In some cases provision may be made for manual intervention when CMS 45 determines that an agent is overloaded or under-utilized. In such a circumstance, for example, there may be no further agents to assign. Alerts may be provided for supervisory persons to make a manual decision, and the supervisor may, in response to such an alert, adjust parameters of the automatic system, such as coefficients used in determining whether an agent is overloaded or not.

Figure 2:
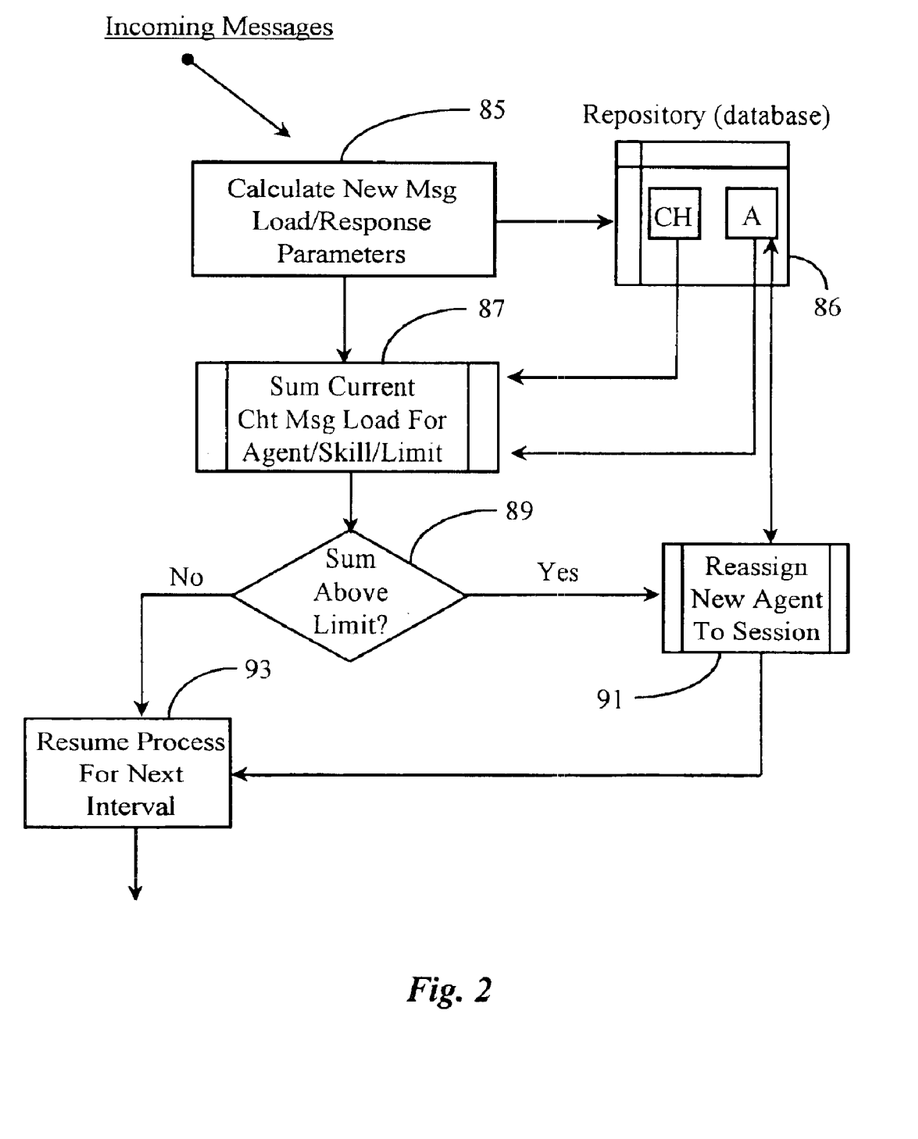
FIG. 2 is a process flowchart illustrating various automated steps associated with an exemplary automated chat-management routine configured to a maximum load limit according to an embodiment of the present invention.

FIG. 2 is a process flowchart illustrating various automated steps associated with an exemplary automated chat-management routine 45 configured to a maximum load limit according to an embodiment of the present invention.

According to a preferred embodiment of the present invention, each ongoing chat session, such as those held in servers 47 and 49 of FIG. 1, is monitored on a periodic basis for current message-load data. This process is represented herein by step 85 labeled "calculate new message load/response parameters". In this embodiment, a frequency over time value is calculated over an arbitrary time period. The sequence is repeated at periodic intervals for the duration of the session. For example, an arbitrary monitoring time-period is established for the agent's chat session or sessions. Such a time period needs to be long enough to reasonably determine what an average load might be over a more extended period of time. A period of 5 minutes is sufficient to get an idea of normal message and response flow. A periodic interval for monitoring may be set at any time period longer than the duration of monitoring. If a 30-minute interval is in effect then the session is monitored at every 30-minute interval for a 5-minute duration.

Alternatively, the time between postings can be measured, to obtain a message load factor. Other, similar methods can be used, such as the average "characters per second flow" etc. Also, the update of such parameters can happen responsive to events, rather than to a fixed time period.

In process 85, trip delays are calculated for each complete interaction (new query and agent response). This is defined in this example as the frequency with which a new query appears and is answered by an agent. If ten complete interactions are observed within the 5-minute duration, then it could be predicted that an average of 120 complete interactions would transpire per hour. At the next 30-minute interval, the process repeats enabling a more refined prediction over a longer period.

Most recent readings reflecting results for one chat session are kept in memory or loaded into a chat (CH) database that may be kept on any connected data repository as illustrated by the directional arrow connecting step 85 to an illustrated repository 86 and CH database. If an agent is hosting more than one session, then each separate session and the most recent load data generic to each session is kept. Sessions (if more than one) may be monitored simultaneously according to the same monitoring rules. In an alternate embodiment, these may be monitored according to rules individual to each session. For the purpose of convenience, it will be assumed that all ongoing sessions hosted by one agent are monitored simultaneously according to the same rules.

Also listed in the illustrated repository 86 is an agent (A) database representing agent parameters associated with the agent hosting the chat sessions listed in CH database. Such parameters include agent name, network ID, network address, current skill levels, language capabilities, and so on. Also listed in database A are the maximum and minimum load values assigned to the agent.

Many considerations may be taken into account in creating accurate and practical load limits for agents. One consideration would be typing proficiency. Another consideration may be how much "innate knowledge" an agent has about certain topics without having to use reference material. Still another consideration would be the fluency level of an agent when speaking certain foreign languages. In some cases, a load limit may be found empirically through simulated chat sessions participated in by fellow agents during training with agents posing typical questions that customers might ask under specified topics.

In process step 85, an algorithm is used to sum current chat-message loads for individual chat sessions hosted by an agent and to compare the results to an agent's preset limit parameters. In this example, a total agent-load result represents the last available readings taken from the CH database as illustrated by the directional arrow connecting the CH database to process 87. Individual session results are combined and averaged over the 5-minute duration, and if required, projected over a longer span such as an hour. Note that the results logged during a next monitoring interval may affect overall load totals. Because chat activity can fluctuate rather rapidly, processes 85 and 87 may be repeated for a number of times before a routing decision is invoked.

Along with the load figures, agent parameters from database A are taken into account in the process. Such parameters may affect which session will be re-assigned (skill level). Moreover skill level parameters are used by IPRTR 43 of FIG. 1 to "look" for a next available agent with a matching skill-set, if required, to assign to a displaced session. Agent skill levels may, in one embodiment, be equated to coefficient values that may be used when calculating agent load. For example, if there were 6 agents in a pool assigned to host chat sessions, each agent would share ⅙, of a total communication-center chat load if their skill levels were identical. However, rarely will each agent share all of the same exact skills as their counterparts. Therefore, a relative value may be assigned to each agent-skill that an agent possesses. In this regard, an agent that is fluent in Spanish (desired skill in this example) would have a lower Spanish coefficient then an agent who is mediocre in Spanish. The lower coefficient reflects less of a load for an agent engaged in a Spanish session than an agent with a higher coefficient would experience. In this way, agent skill levels may be used in an algorithm to determine, for example, which sessions and how many sessions should be assigned to a particular agent.

In this exemplary routine, it is determined in process step 89 whether or not the total message-load projected for an agent over a period of time exceeds the agent's pre-set maximum load-limit for the same period of time. If it does not, process steps 85 and 87 are resumed for all of the agent's current sessions. If, however, the projected agent-load exceeds his or her maximum limit, then one or more of the agent's sessions will be re-assigned to another agent with the same or closely matching skill level at step 91. This assumes, of course that there is an available agent working chat sessions whose limit is not challenged by his or her last readings. If all other assigned agents are near maximum limits, then a new agent may be assigned by IPRTR 43. In this case all agents may be listed in database A whether engaged in hosting chat, or assigned to other duties.

IPRTR 43 may effect reassignment by sending notification to a target agent, which tells the agent which chat session (address) to navigate to and assume control. Similarly, an outgoing agent may receive notification that a new host will be arriving to take over a particular session. Once a new agent has arrived, an outgoing agent may disengage from the target session. In one embodiment, a part-time or floating agent may be dispatched to temporarily help a hosting agent process his or her message-load such that when the total load falls back below a maximum limit the original hosting agent may resume singular control.

It will be apparent to one with skill in the art that a process flow such the one represented herein may be further broken down into many tasks and sub-tasks without departing from the spirit and scope of the present invention. Moreover, differing steps and alternate orders of steps may be assumed depending on the exact circumstances operating within a communication center such as center 15. The CMS routine represented herein may also be applied to comparing results against an agent's pre-set minimum load limit. Such a process flow is detailed below.

Figure 3:
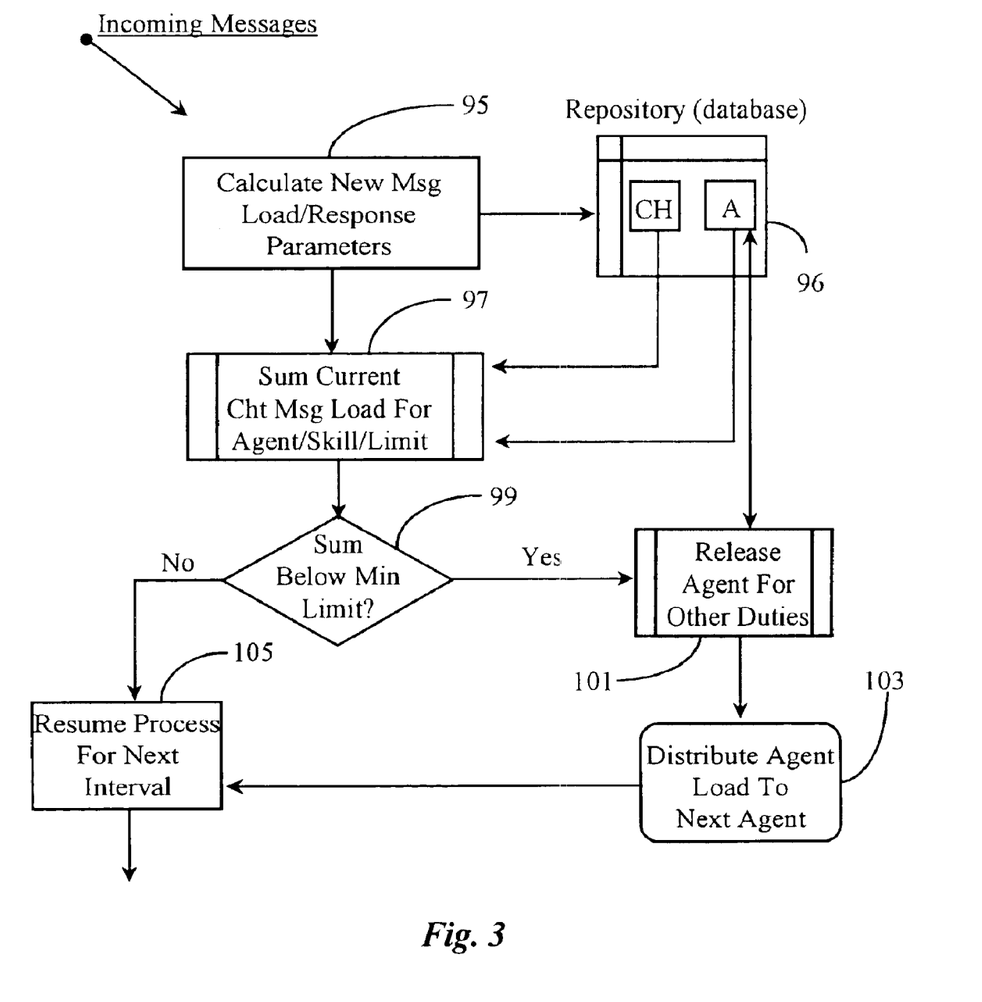
FIG. 3 is a process flowchart illustrating various automated steps associated with an exemplary automated chat-management routine configured to a minimum load limit according to an embodiment of the present invention.

FIG. 3 is a process flowchart illustrating automated steps associated with an exemplary automated chat-management routine configured to a minimum load limit according to an embodiment of the present invention. The process flow represented in this example is the same as for the example of FIG. 2 except that it is configured to a minimum agent load limit instead of a maximum load limit. In actual practice, it is the same routine of FIG. 2 with steps 99, 101, and 103 describing action taken according to "below limit" conditions.

At step 95, incoming messages are monitored for load/response parameters as was described in step 85 of FIG. 2.

Monitored data is loaded into a CH database illustrated by the directional arrow between process 95 and the illustrated repository 96.

At step 97, the stored parameters from CH database along with data from A (agent) database are accessed for the purpose of calculating the total message load for that agent. In step 99, it is determined whether or not the total limit falls below a minimum load-limit set for the agent. If it does not, then step 105 causes resumption of the processes described in steps 95 and 97. However, if it is determined at step 99 that the total calculated load falls below the agent's minimum limit, then the agent in question is released for other duties in step 101.

Release of the agent may be effected by notification sent to the agent by such as IPRTR 43 of FIG. 1. This may be such as a screen pop-up, or other convenient method. At step 103, the agent's load (all running sessions) are distributed to other agents with matching skill-sets. In actual practice, the agent or agents assuming the released agent's load are notified which sessions to navigate to and assume control of. Such notification may be of the form of a screen notification to the agents appearing on their VDU's. It is noted here that IPRTR 43 has access to all of the recent statistics regarding all agent activity within center 15, including those who are not assigned to chat duty. At step 105, the process resumes at a next monitoring interval for agents and their sessions that are still active.

It will be apparent to one with skill in the art that the processes illustrated by FIGS. 2 and 3 may in practice be combined, and managed by one software 45, and CMS of the present invention may be used in conjunction with any IPNT-capable communication center wherein chat sessions are conducted and hosted by agents without departing from the spirit and scope of the present invention. For example, CMS may be practiced in a dual-capable center as well as an IPNT center.

In one embodiment, CMS software can be implemented on a shared data network wherein agents host sessions in network servers from home computers having network connection capability. Agents who log-on to the network are assigned initial chat sessions held in network servers. Re-assignment and balancing of agents to sessions commences through monitoring and calculating agent loads as described in FIGS. 2 and 3. A main server and repository connected to the network may be adapted to host the CMS routines and to store associated agent's parameters. In this embodiment, agents who are released from duty may be automatically logged off of the network. If new agents are needed to handle network loads, then agents may be contacted at home by the network and asked if they could log-on and work. A system such as this may pay agents according to skill-set and hours spent hosting sessions. Lesser skilled agents would be the first to be logged off during slow periods. There are many possibilities.

Auto-assisting Agent Responses

In one aspect of the present invention a method and apparatus including software is provided and adapted to enable quick responses to oft-asked questions without requiring a hosting agent to manually type a response. Such a method and apparatus is detailed fully below.

Figure 4:
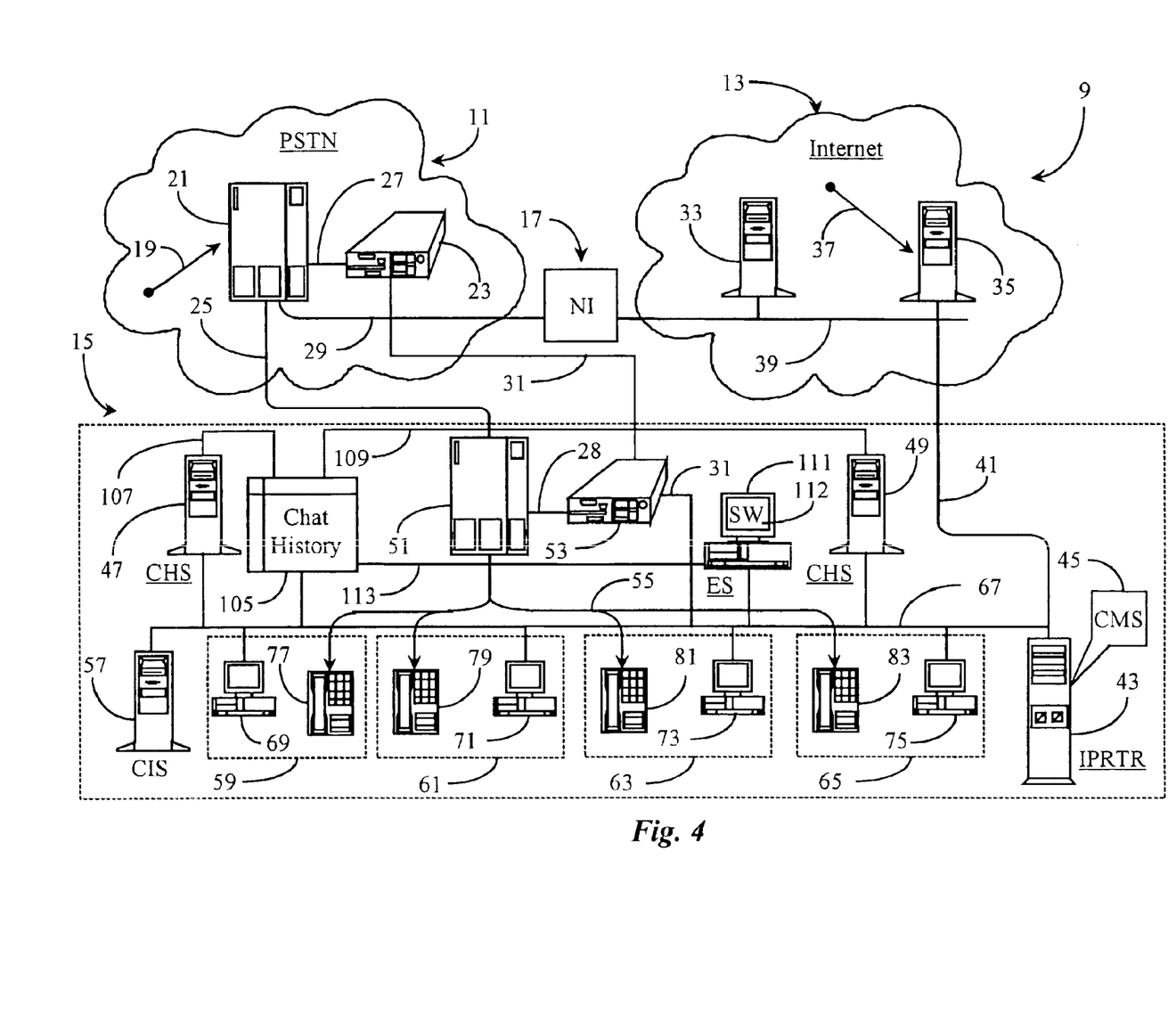
FIG. 4 is an overview of the communications network of FIG. 1 further enhanced to practice auto-agent-response assistance according to an embodiment of the present invention.

FIG. 4 is an overview of the communications network of FIG. 1 further enhanced to practice auto-agent-response assistance according to an embodiment of the present invention. Communication network 9 comprising Internet 13, PSTN 11, and communication center 15 is essentially unchanged from the description provided in FIG. 1 above accept for newly introduced elements provided in communication center 15. Therefore, only new elements of the present invention not before described are introduced in this embodiment. Elements common to the example of FIG. 1 are not re-introduced but are referred to by reference if required.

In a multi-media communication center such as center 15, it is known by the inventors that all communications incoming thereto or outgoing therefrom may be recorded, rendered as text equivalents, if not already text, and may be stored in a repository for later research and other purposes. Text entities and text accounts of non-text interactions are stored and related and indexed (threading).

Threading describes a process of logically associating a series of ongoing interactions that have occurred and storing them in a database provided and adapted for the purpose. For example, a thread may be reserved for a particular customer of center 15 and all agents of center 15 that have interacted over time with that same customer. Such a thread would contain all of the text accounts of interactions that have taken place between center 15 and the customer regardless of the original media-type of interaction. Types of media interaction that can be threaded may include any that is supported by center 15 such as telephone, IP phone, fax, e-mail, chat and so on.

Threaded dialog may assume other characteristics aside from being reserved for a particular customer. Instead of being assigned to a particular customer, a thread may be assigned a product line or specific product. Therefore any communication center interaction concerning that product line or product would be contained in the thread. There are no limits to categorization or association rules. A variety of known technologies such as voice to text recording, optical character recognition (OCR), object linking and embedding (OLE), or even human-assisted translation may be used to convert interactions into threaded text accounts.

In the practice of interactive IP chat, to which the present invention particularly pertains, all interactions of each chat session are recorded into a history database. Such a chat history is exemplified herein by a repository 105 provided in communication center 15 and connected to LAN 67. Repository 105 stores all threaded text-interactions related to all of the ongoing chat sessions hosted in chat servers 47 and 49. Separate data connections 107 (from CHS 47 into repository 105) and 109 (from CHS 49 into repository 105) provide a means for automated entry of each query and response for each separate session.

In this example, it is assumed that all ongoing sessions occurring in servers 47 and 49 are text-based chat sessions. However, this is not required to practice the present invention. Voice chat may be recorded and text-rendered using a suitable voice-to-text technology, which is known in the art and available to the inventor. It is possible that some chat sessions hosted in such as servers 47 and 49 may be voice-based while others are text-based.

In this example, repository 105 is managed and sectored such that threaded dialogs stored therein are individual to each specific chat session. Such dialogs include all participant queries and associated agent responses, agent ID and machine address, session topic, and session address. Each query may or may not be identified by the person posting the query. For example, in some sessions participants may adopt monikers or characters with nicknames as their only identification. In other sessions, participant numbers, names, e-mail addresses, or other identifying parameters may be present. As soon as an incoming message arrives in one of servers 47 or 49, it is immediately logged into repository 105 (mirrored) and assumes its place in a dialog thread particular to the session receiving the message.

An editing station (ES) 111 is provided within communication center 15 and is connected to LAN 67. ES 111 is adapted as a relatively powerful computer workstation manned by a knowledge worker (KW). ES 111 has a software application (SW) 112 provided therein and adapted to parse incoming text queries entering repository 105 and matching them by probability or exact match (if available) to stored queries that already have valid agent responses associated. Such stored queries represent queries that are repeatedly received by agents hosting chat sessions. Therefore, matching responses represent common responses repeatedly made by agents when responding to such queries.

ES 111 is connected to repository 105 by a separate data link 113. In this way, ES 111 utilizing SW 112 receives all new queries as soon as they are posted in servers 47 and 49. It is important to note here that all new queries are tagged with session topic, session address, agent ID, agent machine address, and customer ID (if appropriate). Software 112 registers each received query and parses it for content (meaning). A knowledge base (KB not shown) is provided and adapted to store standard queries that are often posted by participants in any ongoing sessions that are being held. Such a KB may be stored on ES 111 or, perhaps on a connected repository. In one embodiment repository 105 may be used to store the KB.

After a query is parsed and matched to a standard query or queries, then SW 112 looks for associated responses to the matching query or queries. Such responses may be stored in a same KB and associated with each standard query. Standard queries and responses may, in one embodiment, be derived from researching threaded chat histories stored in repository 105. Rules governing criteria for selecting a query/response pair as a standard query/response pair may be as simple as setting a frequency threshold in a specific chat session dialog that indicates how often the query is posted and responded to over any given period of time such as during one session length.

Researching threaded chat dialogs may be performed manually by assigned agents in order to load a knowledge base with standard query/response pairs. It is duly noted however, that each query/response pair in a group of such pairs that is studied for standardization may not exactly match one another in context, but will have the same content (meaning) regarding query and associated response. Standardization accomplishes a goal of providing a basic tool for an agent to use to receive a correct auto-response to send to a participant.

It is possible that one parsed query can be matched to more than one standard query. This would occur in the case of matching by probability to context, content, or a combination thereof For example, one posted query may match a stored query with a 98% probability, a second stored query with an 87% probability and a third with a 79% probability. All three stored queries may be routed to a hosting agent such as one operating at one of stations 59–65 for selection as to which query more closely matches the actual query appearing in his or her chat window.

Matching responses are routed from ES 111 to an appropriate agent hosting the session in which the target query was posted such as an agent operating one of stations 59–65 as described above. Responses may, in one embodiment, be sent in the form of keyboard commands such that a receiving agent need only type a few keys to post a valid response in the appropriate chat interaction window.

In an alternative embodiment, matching responses are sent with the matching queries in pairs as stored in a KB. By clicking on a closest matching query, an agent may automatically paste the associated response to the appropriate chat window. In this case an agent could read the response before pasting it into a chat window. However, providing a keyboard command instead of an actual response allows an agent to avoid reading the actual response, which can consume valuable time. A keyboard command may always start with a specific key such as "insert", "Ctrl" or an extra key such as a "response key" provided to all agent keyboards and adapted for the purpose. Key commands following the "mode" key may indicate the specific standard response as stored in a KB.

In one embodiment, a KW operating station 111 running SW 112 may send responses stored in a KB directly to chat windows without agent interaction. This embodiment would assume that a KW has final editing power over responses and can view actual queries compared to matching queries such as on a graphic user interface associated with station 111. However, such editing takes time and may not be practical for many incoming queries drawing hits and requiring responses. Editing may instead be reserved for matches that fall below a certain probability such as, perhaps 95%. An agent may also be allowed a final decision whether or not to paste a provided response or type one in based on the validity of the closest standard response to the actual query. More detail about SW 112 and various methods for practicing the present invention is provided below.

Figure 5:
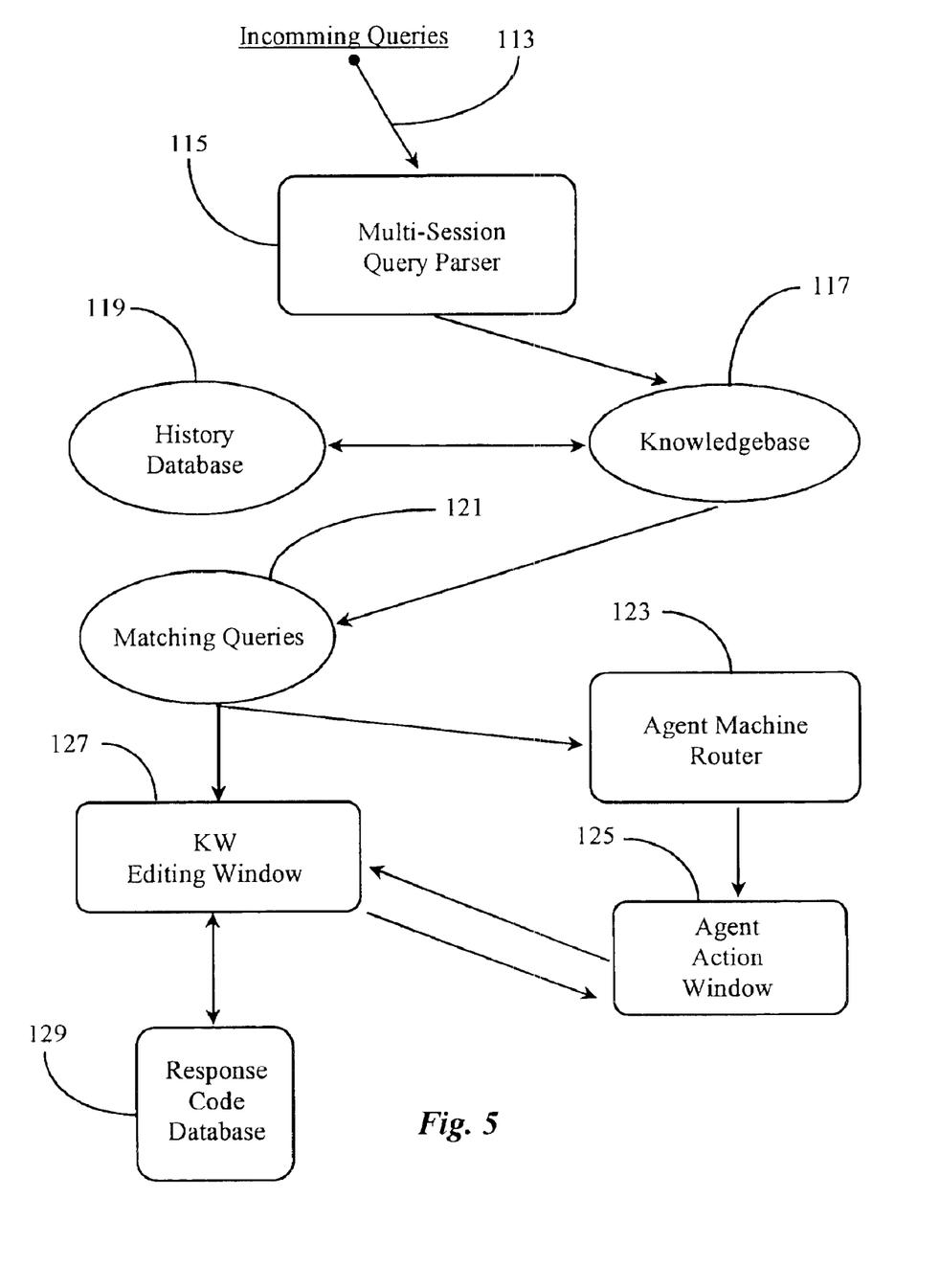
FIG. 5 is a block diagram illustrating component interaction of the auto-agent-assist software of FIG. 4 according to an embodiment of the present invention.

FIG. 5 is a block diagram illustrating component interaction of SW 112 of FIG. 4 according to an embodiment of the present invention. According to a preferred embodiment of the present invention, SW 112 is utilized such that an agent still retains a final decision as whether to post a provided response or type one using innate knowledge or other resources. Keeping in mind that each agent may be conducting several sessions, and that there may be several agents assigned to chat duty, a single KW would face a significant challenge if required to edit many responses. Therefore, it is desired that editing only be performed under specific circumstance or abandoned in favor of an agent typing his or her own response. The description of various components and interaction possibilities provided below is intended to provide a simple example of efficient use of the present invention according to one of many possible embodiments.

SW 112 uses a multi-session query parser 115 to process all incoming queries 113 for possible matches stored in a provided KB such as KB 117. It is noted herein that all incoming queries 113 are processed for a match, but only certain "standard queries" will draw matches. Rules governing probability rate required to draw a match may be provided to insure a high rate of validity for matching responses to an actual query. For example, if a query draws lower than an 85% probability in a match or matches then it may be ignored. By researching and standardizing queries and response pairs over time, additional rules may be incorporated in order to further increase high probability of matching stored semantics to actual queries.

Parser 115 may use a combination of techniques in order to parse a query for a match. Context, key words, punctuation, and sentence structure may all play a part in determining whether a query will draw a match. For example, an actual query such as "How do I run this program on Windows 98™?" contains common characteristics and keywords that may also be found in standard queries stored in KB 117. Keywords may include "How", "run", "program", "Windows 98™". The punctuation mark "?" indicates a question. A matching series of queries may be exemplified as follows.

"How is this program activated from Windows 98™?". . . 98%

"How can this program be run from Windows NT™?". . . 95%

"Can this program be run from Dos?". . . 89%

The three standard queries provided above represent found matches to the actual parsed query "How do I run this program on Windows 98™?" It is noted here that none of the standard queries matches the actual query exactly or 100%. Therefore, all three standard queries are included for consideration. It will be appreciated that responses to the three standard queries will be different from each other. KB 117 contains, in a preferred embodiment, the standardized responses already associated with the matching standard queries. Alternatively, KB 117 may pull threaded responses from a history database 119 that equate to the loaded queries.

The matching queries including probability parameters represented by element number 121 are routed to the appropriate agent by an agent router application 123 from ES station 111 of FIG. 4 over LAN 67. Each incoming query 113 has been tagged with session address, agent ID, agent machine address, and any other information that may be utilized to route the matching queries. Matching queries appear in an agent action window represented by element number 125 located on a target agents station such as one of stations 59–65 of FIG. 4. Such an action window may be a pop-up window separate from chat windows, or it may be a window built into a chat window. In the latter case, an agent may have one action window for each running chat session that he is hosting.

Matching queries preferably appear before an agent begins typing a response to an original query. A short time period may be imposed before an agent begins responding to an actual query to allow for the matching and routing process. The end of such a time period may be marked by such as an audible alert or flashing icon. If no presented matches appear in window 125 during a wait time, an agent simply proceeds by typing his or her own response to a query such as query 113.

In the event that matching queries appear in window 125, then an agent would select the response that matches query 113 with enough accuracy to insure that a provided auto-response would be appropriate. If none of the matches is sufficiently accurate in content to insure a correct response, then the target agent may ignore the queries and proceed to type his or her own response. If, however, one of the standard queries matches in content to query 113 an agent may click on that query such as by mouse click or highlight the query by keyboard input method and select it by keyboard entry.

In this example, selecting a standard query in agent window 125 sends a request back to ES 111 for a response code. In this example, response codes represent keyboard commands that when executed cause the associated response to be automatically posted into the appropriate chat window containing the original query. Response codes may be stored in a separate database such as database 129 and associated with standard responses found in KB 117 or in history database 119. The correct response code is routed back to agent window 125 as a keyboard instruction to the agent. In this way, the agent does not have to remove his or her hands from the keyboard in order to paste a response. The agent simply types in the code and moves on. The correct response then appears in text form as if the agent had typed it.

Using a response code allows an agent to remain focussed and unconcerned with the validity of a response. If text responses are sent along with matching queries and appear in window 125, an agent may be tempted to read responses thereby consuming valuable response time. In one embodiment, response codes may be sent along with matching queries such that if an agent selects a query, the response code is automatically invoked. As an agent becomes familiar with such codes over time, he may use them to paste standard responses to actual queries without waiting for a query match. If the system detects a response code has been activated during a query matching process then the process can be abandoned.

It will be apparent to one with skill in the art that the components and interaction presented above may vary considerably according to enterprise rules and procedures. For example, response code enhancement may or may not be used. It may be required that agents wait for response options before answering any query. Responses may be sent in text form along with matching queries such that an agent recognizing an accurate match may drag and drop the associated response into an appropriate chat window. There are many possibilities.

In one embodiment, a KW operating at such as station 111 running software 112 may edit responses before routing them to agents. In another embodiment, responses may be routed through agents into appropriate chat windows without agent interaction. In still another embodiment, station 111 may be fully automated and not require the use of a KW. In this case, matching queries and response pairs may be automatically routed to agents when original queries are processed. The agent would then reserve a final decision regarding using an auto-response or typing one.

Figure 6:
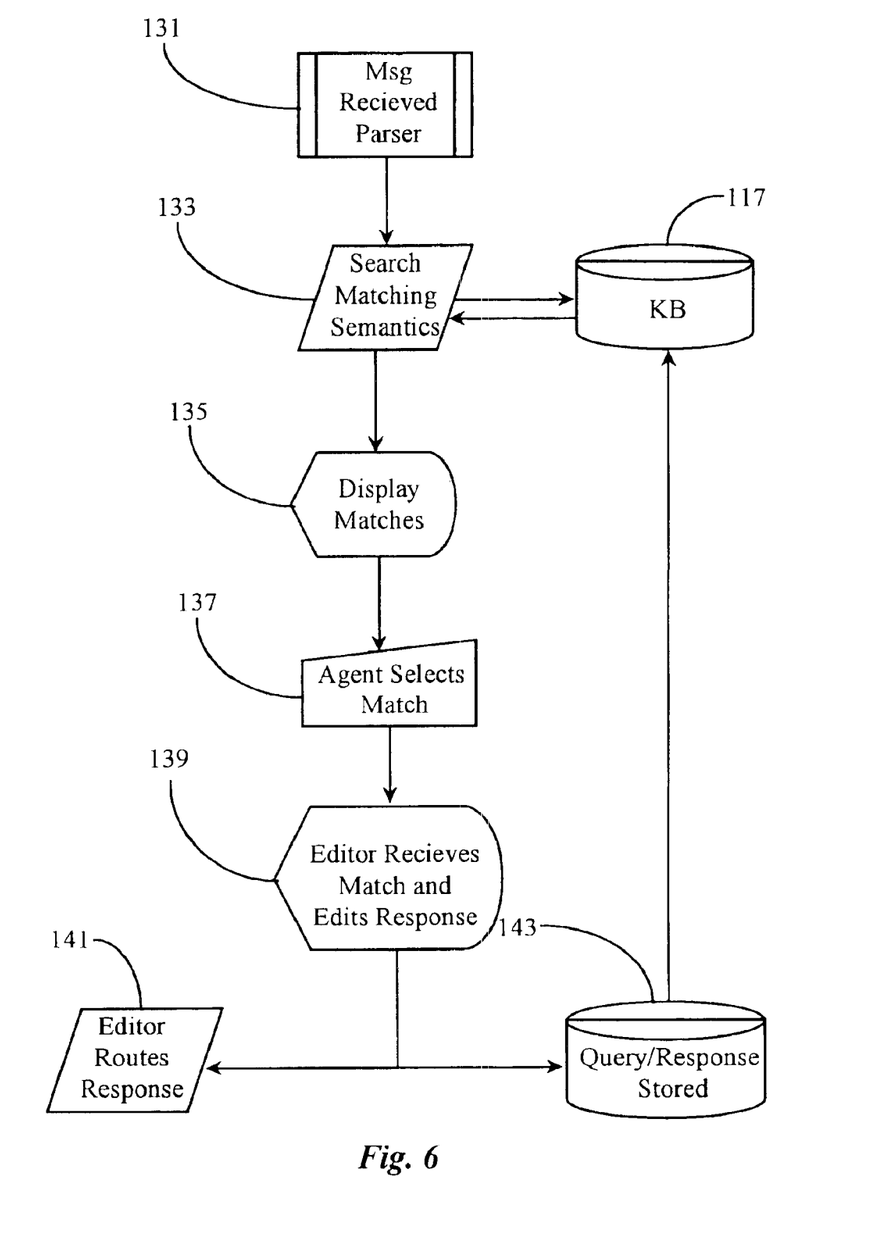
FIG. 6 is a process flow diagram illustrating various steps for practicing an auto-agent assist enhancement according to an embodiment of the present invention.

FIG. 6 is a process flow diagram illustrating various steps for practicing the present invention according to a preferred embodiment. In this example, incoming messages are received and parsed in step 131. It is important to note here that standardized queries involve questions posed by chat participants that require responses (answers). As such, chat session rules may limit participant interaction to the posing of questions rather than allowing them to post statements or comments that do not require response by an agent. Questions or queries would, of course, be limited to the topic or topics sanctioned in the chat session.

At step 133 a parsing engine such as parser 115 of FIG. 5 parses a message for content. As previously described, keywords such as nouns, verbs, product names, platform types, etc are parsed from the message. Sentence structure and punctuation may also be considered. Also in step 133, a KB such as KB 117 is consulted for matching semantics. KB 117 may store standardized query/response pairs that have been standardized from actual query/response pairs studied from chat history. KB 117 may only contain matching queries and associated response codes that are linked to responses contained in a history database, or standardized responses held separately. There are many possibilities.

At step 135 matching queries are routed to an agent's machine such as at one of stations 59–65 of FIG. 4 over LAN 67 (FIG. 4) and appear in text form in an action window such as window 125 of FIG. 5. At step 137 a target agent selects a query that matches the content of the actual query. If none of the matching queries reflects the actual content of an original query to an extent that an accurate auto-response is possible, an agent may elect to ignore the queries and type his or her own response. It is more likely however that one of the found queries will closely if not exactly match the content of an actual query due to careful and strict standardization and KB loading rules.

In an embodiment wherein a KW such as one operating station 111 of FIG. 4 may edit responses, then an agent may, by default, select the closest matching standard query to the actual query even though the associated response may not completely and accurately answer the actual query. In this case, the auto-response may be edited by an attending KW before being routed. Such response editing may be limited to query probability rates that fall under a certain level to allow for more streamlined performance. For example, if a standard query matches an actual query by 95% or above, then it is extremely likely that no response editing would be required. If a closest standard query matches an actual query by only 85%, then some response editing may be required.At step 139, an editor (KW) receives a standard query selected by an agent and edits an associated response (if required). Because ES 111 controls the process of matching and routing queries, a KW has, by default, viewing access to original queries entering the system, matched queries found by the system, and auto-responses generated by the system. It is desired however that editing be limited as much as possible as editing many responses can delay agent-response time.At step 141, an editor (KW) routes a response to a target agent for pasting into a chat dialog or, in some cases directly to the chat dialog in automated fashion without agent interaction. At step 143 the latest query/response pair may be loaded into KB 117 to be considered as a new standard query/response pair for a next chat session under the same topic.It will be apparent to one with skill in the art that the process steps described above may be vary somewhat according to rules observed within a communication center. For example, response editing may be abandoned in favor of agent discretion. In one embodiment, a KW operating station 111 running SW 112 (FIG. 4) may route responses directly to chat sessions without agent interaction. In this case, the only required action by an agent is selecting a closest matching standard query.In one embodiment, a response-code enhancement is provided wherein an agent selects a matching query and receives a simple keyboard instruction for loading a response into a chat dialog. In this embodiment, an agent, who may be leading several simultaneous chat sessions, may briefly interrupt a manual (typed) response in one window in order to answer one or more queries in other windows by keying in the appropriate commands as instructed through an agent window or windows such as window 125 of FIG. 5. This may be accomplished without an agent taking his hands away from the keyboard area of his station, which is an important consideration due to the possibility of high message load.The method and apparatus of the present invention acts to assist agents to lighten their chat message-loads by providing auto-response tools to an agent for quickly answering oft asked questions posed repeatedly in chat sessions. The method and apparatus of the present invention may be practiced in any IP communication-center environment without departing from the spirit and scope of the present invention. Therefore the present invention should be afforded the broadest scope. The methods and apparatus of the present invention are limited only by the claims that follow.

What is claimed is:1. A method for aiding a live agent in a hosted communication session wherein agents participate in and host chat room communication sessions on the Internet, comprising steps of:
  (a) accessing an incoming queiy to an agent-hosted chat session by a comparison system;
  (b) comparing the incoming query with queries in a database having stored queries matched with stored responses; and
  (c) in the case of a match, providing the stored response to the live agent for use in responding to the incoming query.2. The method of claim 1 wherein, in step (a) the incoming query is parsed for content.3. The method of claim 2 wherein the parsing includes one or both of determining one or more keywords in the incoming query, and determining sentence structure.4. The method of claim 1 wherein, in step (a) the incoming query is intercepted by a hardware/software system which relates the query to one or more of the hosted session, the agent host, and the sender, and stores the query, associated with the agent's response, in a thread-managed database.5. The method of claim 4 wherein the hardware/software system parses the query and searches the database for matching or near-matching queries associated with stored responses, and finding matches or near matches, causes candidate responses to be posted to the agent.6. The method of claim 5 wherein multiple candidate responses are provided to the agent with or without the associated query, and wherein the agent has a selection mechanism for quickly selecting and posting a selected response to the query.7. The method of claim 5 wherein a response is posted to the query automatically by the system without selection or intervention by the agent.8. The method of claim 4 further comprising an interface for a knowledge worker, such that queries and associated responses are displayed for the knowledge worker, who may use provided tools for selecting, editing, and posting responses to individual ones of hosted sessions.9. The method of claim 5 wherein standard responses are provided to the agent as keystroke response codes, wherein the agent may select and post a response by one or a combination of keystrokes.10. A system for aiding live agent hosts in hosted communication sessions wherein agents participate in and host chat room communication sessions on the Internet, comprising:
  a hardware/software system for associating incoming queries with agent-composed responses and storing associated query-responses in a thread-managed database; and
  an agent station having a user interface for the live agent to interact with the system;
  characterized in that the hardware/software system accesses an incoming query, searches for matches and near-matches to previously stored queries associated with responses, and finding a match, provides the response or responses to the agent at the agent station to be used in responding to the incoming query.11. The system of claim 10 wherein the incoming query is parsed for content.12. The system of claim 11 wherein the parsing includes one or both of determining one or more keywords in the incoming query, and determining sentence structure.13. The system of claim 10 wherein the incoming query is related to one or more of the hosted sessions, the agent host, and the sender, and stored, associated with the agent's response, in a thread-managed database.14. The system of claim 13 wherein the hardware/software system parses the query and searches the database for matching or near-matching queries associated with stored responses, and finding matches or near matches, causes candidate responses to be posted to the agent.

15. The system of claim 14 wherein multiple candidate responses are provided to the agent with or without the associated query, and wherein the agent station comprises a selection mechanism for quickly selecting and posting a selected response to the query by the agent.

16. The system of claim 14 wherein a response is posted to the query automatically by the system without selection or intervention by the agent at the agent station.

17. The system of claim 13 further comprising a workstation with an interface for a knowledge worker, such that queries and associated responses are displayed for the knowledge worker, who may use provided tools for selecting, editing, and posting responses to individual ones of hosted sessions.

18. The system of claim 14 wherein standard responses are provided to the agent as keystroke response codes, wherein the agent may select and post a response by one or a combination of keystrokes.

* * * * *

UNITED STATES PATENT AND TRADEMARK OFFICE
CERTIFICATE OF CORRECTION

PATENT NO. : 6,922,689 B2  Page 1 of 1
APPLICATION NO. : 09/457608
DATED : July 26, 2005
INVENTOR(S) : Yuri Shtivelman It is certified that error appears in the above-identified patent and that said Letters Patent is hereby corrected as shown below:

Column 17 line 61 currently reads:
(a) accessing an incoming queiy to an agent-hosted chat Column 17 line 61 should read:
(a) accessing an incoming query to an agent-hosted chat Column 17 line 58 through column 18 line 59 Claims 1-14 have not been delineated by claim.
Claims 1-18 should read as attached on separate sheet Signed and Sealed this Fifteenth Day of August, 2006

JON W. DUDAS
*Director of the United States Patent and Trademark Office*